(12) United States Patent
Chen

(10) Patent No.: US 11,700,940 B1
(45) Date of Patent: Jul. 18, 2023

(54) COMBINATION SHELF WITH DUAL-POLE VERTICAL COLUMNS

(71) Applicant: PROTREND CO., LTD., Taipei (TW)

(72) Inventor: Henry Chen, Taipei (TW)

(73) Assignee: PROTREND CO., LTD., Taipei (TW)

( * ) Notice: Subject to any disclaimer, the term of this patent is extended or adjusted under 35 U.S.C. 154(b) by 0 days.

(21) Appl. No.: 17/950,141

(22) Filed: Sep. 22, 2022

(51) Int. Cl.
*A47B 57/54* (2006.01)
*A47B 47/00* (2006.01)
*F16B 2/24* (2006.01)

(52) U.S. Cl.
CPC ........ *A47B 57/545* (2013.01); *A47B 47/0083* (2013.01); *F16B 2/245* (2013.01)

(58) Field of Classification Search
CPC ... A47B 57/545; A47B 47/0083; A47B 57/48; A47B 57/00; A47B 57/06; A47B 57/26; A47B 57/265; A47B 57/30; A47B 57/20; A47B 57/54; A47B 54/562; A47B 57/567; A47B 47/021; A47B 47/024; A47B 96/06; A47B 96/1408; A47B 57/36; A47B 57/38; A47B 57/12; A47B 57/14; F16B 2/245
USPC ........................................ 211/187
See application file for complete search history.

(56) References Cited

U.S. PATENT DOCUMENTS

| | | | | |
|---|---|---|---|---|
| 3,208,406 A | * | 9/1965 | Maslow ................ | A47B 55/02 297/248 |
| 4,079,678 A | * | 3/1978 | Champagne ......... | A47B 57/545 108/106 |
| 4,582,001 A | * | 4/1986 | Leikarts ................. | F16B 7/048 108/106 |
| 4,592,286 A | * | 6/1986 | Trubiano ............. | A47B 57/545 211/208 |
| 4,750,626 A | * | 6/1988 | Nicely ................. | A47B 57/265 211/187 |
| 5,065,873 A | * | 11/1991 | Tseng ..................... | A47B 57/54 211/186 |
| 5,303,645 A | * | 4/1994 | Meacham ............ | A47B 57/545 108/180 |
| 5,676,263 A | * | 10/1997 | Chang ...................... | A47F 5/13 211/187 |
| 6,044,988 A | * | 4/2000 | Yang .................... | A47B 57/265 211/187 |
| 6,253,687 B1 | * | 7/2001 | McAllister ........... | A47B 57/545 108/107 |

(Continued)

*Primary Examiner* — Jennifer E. Novosad
(74) *Attorney, Agent, or Firm* — WPAT, P.C

(57) ABSTRACT

A combination shelf includes at least four column units, at least two storage layers, and multiple clips. The column unit consists of two parallel, vertical poles on the left and right, and multiple connections connecting the left and right vertical poles. The clip has a vertical groove with a wing located on both sides at the lower halves of the front and rear ends of the groove opening. The grooves of the clips can be embedded by the vertical poles. The front and rear ends of both sides of the storage layer each offers an outward-opening U-shaped fastener. The front and rear edges of the lower half of the fastener each has a top pusher. The fasteners of the storage layer can each cover the exterior of the clips of the column units. The inner faces of the two top pushers each presses the two wings. By fitting together the corresponding bevels of the top pushers and the two wings, the clips and the fasteners press each other and therefore clamping the vertical pole.

4 Claims, 11 Drawing Sheets

(56) References Cited

U.S. PATENT DOCUMENTS

| | | | | |
|---|---|---|---|---|
| 6,253,933 B1* | 7/2001 | Yang | A47B 57/545 211/187 |
| 6,431,090 B1* | 8/2002 | Davis | A47B 57/04 108/107 |
| 7,059,484 B1* | 6/2006 | Goldberg | A47B 47/0083 211/187 |
| 7,478,971 B2* | 1/2009 | Li | A47B 57/562 403/398 |
| 7,543,540 B2* | 6/2009 | Tatematsu | F16B 12/46 108/192 |
| 7,568,436 B2* | 8/2009 | McAllister | A47B 57/265 211/187 |
| 7,992,731 B2* | 8/2011 | Mcallister | A47B 57/545 211/187 |
| 8,016,140 B2* | 9/2011 | Hsieh | A47B 47/0083 211/187 |
| 8,490,800 B2* | 7/2013 | Noble Colin | A47F 5/0087 211/187 |
| 8,505,752 B2* | 8/2013 | Shinozaki | A47B 57/34 211/208 |
| 8,627,966 B2* | 1/2014 | Jarvis | A47B 57/545 211/187 |
| 8,651,300 B2* | 2/2014 | Chen | A47B 47/024 211/187 |
| 8,678,207 B2* | 3/2014 | Shimazaki | A47B 57/545 211/208 |
| 8,887,647 B2* | 11/2014 | Sabounjian | A47B 57/10 211/187 |
| 9,167,915 B1* | 10/2015 | Lau | A47B 57/545 |
| 9,314,098 B2* | 4/2016 | Sabounjian | A47B 57/545 |
| 9,380,868 B1* | 7/2016 | Fu | A47B 47/0083 |
| 9,468,294 B2* | 10/2016 | Fu | A47B 57/34 |
| 9,585,469 B2* | 3/2017 | Huang | A47B 47/021 |
| 10,058,174 B1* | 8/2018 | Tang | A47B 57/545 |
| 10,080,437 B1* | 9/2018 | Tang | A47B 47/0091 |
| 10,376,048 B2* | 8/2019 | Kessell | A47B 57/26 |
| 10,441,074 B2* | 10/2019 | Dahatonde | A47B 96/1441 |
| 11,419,412 B1* | 8/2022 | Chen | A47B 96/1441 |
| 2009/0321597 A1* | 12/2009 | Matsumoto | A47G 25/0607 248/219.4 |
| 2010/0108631 A1* | 5/2010 | McAllister | A47B 57/545 211/187 |
| 2011/0233164 A1* | 9/2011 | Chang | A47B 87/001 211/188 |
| 2016/0037915 A1* | 2/2016 | Fu | A47B 57/34 211/187 |
| 2017/0224106 A1* | 8/2017 | Sabounjian | A47B 47/0083 |
| 2018/0317651 A1* | 11/2018 | Tang | A47B 57/545 |
| 2019/0343277 A1* | 11/2019 | Sabounjian | A47B 47/0083 |
| 2021/0372448 A1* | 12/2021 | Yang | F16B 12/44 |
| 2022/0378197 A1* | 12/2022 | Chen | A47B 57/545 |

* cited by examiner

COMBINATION SHELF WITH DUAL-POLE VERTICAL COLUMNS

FIELD OF INVENTION

This invention discloses a combination shelf which consists of at least four column units and multiple storage layers. In this device, the column units are clamped by the fasteners of the storage layers and clips of the column units, which allows the storage layers and the column units to be assembled into a shelf.

PRIOR ART

The combination shelves disclosed in U.S. Pat. Nos. 5,676,263, 5,303,645 consist of grooves on the peripherals of the columns. The columns offer multiple ring-grooves for tapered clips to be clamped into place. Then, the tapered sleeves on the corners of the storage layers are placed onto the clips, pressing the clips to secure the storage layer. The storage layers assembled on both sides of the column are inevitably at different heights, giving the entire shelf a disorderly appearance.

The combination shelf revealed in U.S. Pat. No. 8,651,300 consists of at least four column units and at least two storage layers. The column units consist of two parallel, vertical poles on their left and right, and multiple connections linking the two left and right vertical poles. The clip offers a vertical groove with a wing at both ends of the opening of the groove. The groove of the clip can accommodate the vertical pole of the column unit so that the clip is assembled on the column unit. The front and rear ends of both sides of the storage layer each has a C-shaped clip opening outward which tightens the two wings of the clip. The mating surface of the C-shaped clip and the two wings is a bevel. When the storage layer is moved downwards, the C-shaped clip pushes the two wings, forcing the clip to tightly clamp the vertical pole. This allows the C-shaped clips of the four corners of the storage layer to be secured to the vertical poles of the front, rear, left and right column units respectively.

In the U.S. Pat. No. 8,651,300, the openings of the C-shaped clips on the shelf, after use for a period of time, will gradually be expanded and enlarged. This makes the storage layer sink overtime, and eventually tilt or even fall. In addition, in the U.S. Pat. No. 8,651,300, the clips are made of plastic material with insufficient rigidity.

SUMMARY OF THE INVENTION

The main purpose of this invention is to disclose a combination shelf that enables the storage layer to be stably mounted on the column units and to improve the overall structural strength of the shelf.

The combination shelf disclosed in this invention is composed of at least four column units and at least two storage layers. The four corners of each storage layer are the placed onto the four column units. A clip is placed in between each corner of the storage layer and the column unit. With the column units clamped between the clips and the storage layer, the storage layer is assembled between the column units.

The column unit consists of two parallel, vertical poles on the left and right, and multiple connections linking the left and right vertical poles. The left and right vertical poles can each accommodate a storage layer.

The clip has a vertical groove with a wing attached to both sides of the lower halves of the front and rear ends of the groove opening. The outer faces of the two wings are bevels where the lower ends gradually protrude outward. The vertical pole can be embedded into the groove of the clip, and the opening of the groove faces the storage layer. The lower end of the clip has a horizontally extending groove. The connections of the column units can be inserted into the grooves of the clips.

The front and rear ends of both sides of the storage layer each offers an outward-opening U-shaped fastener. The front and rear edges of the lower half of the fastener each has a top pusher. The inner faces of the two top pushers are bevels. The upper ends protrude gradually from the lower ends.

The fasteners of the front and rear ends of both sides of the storage layer can each cover the exterior of the corresponding clips of the front, rear, left and right column units. The inner faces of the two top pushers of each fastener press the outer faces of the wings of the corresponding clips. By means of fitting together the corresponding bevels of the top pushers and the two wings, the clips and the fasteners are pushed to each other and therefore clamping the vertical pole.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DESCRIPTION OF PREFERRED EMBODIMENT

Figure 1:
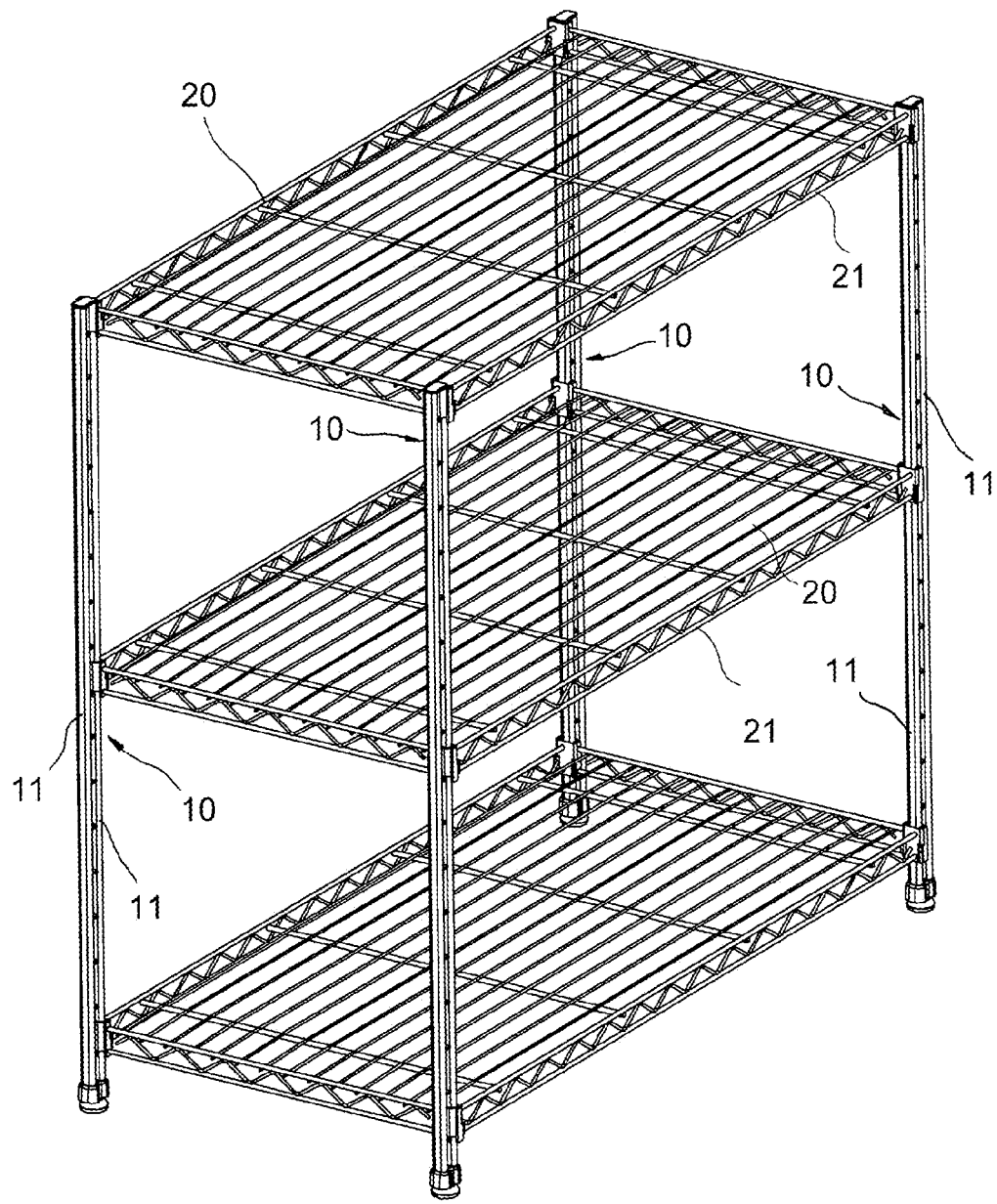
FIG. 1 shows the external drawing of the embodiment of the invention.
Figure 2:
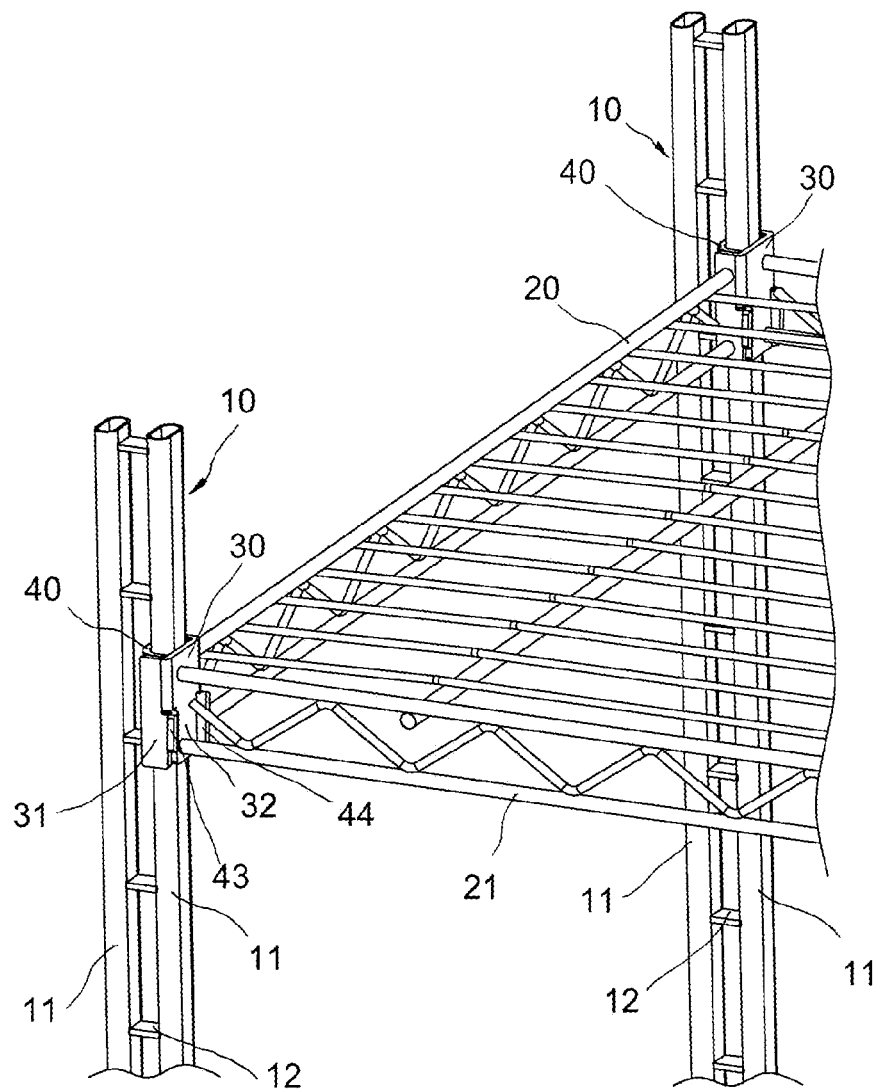
FIG. 2 shows an enlarged local view of the embodiment shown in FIG. 1.

Please refer to FIGS. 1 and 2. The combination shelf disclosed in this invention is composed of at least four column units 10 and at least two storage layers 20. The column unit 10 consists of two vertical poles 11 on the left and right sides, and multiple horizontal connections 12 placed from top to bottom. The connections 12 are located between the left and right vertical poles 11, linking together the left and right vertical poles 11. The two ends of the connection 12 link with the left and right vertical poles 11, and the width of the connection 12 defines the spacing between the left and right vertical poles 11. The vertical poles 11 of the column unit 10 can be chosen as flat tubes which comes with arched ends and flat mid-sections.

Figure 3:
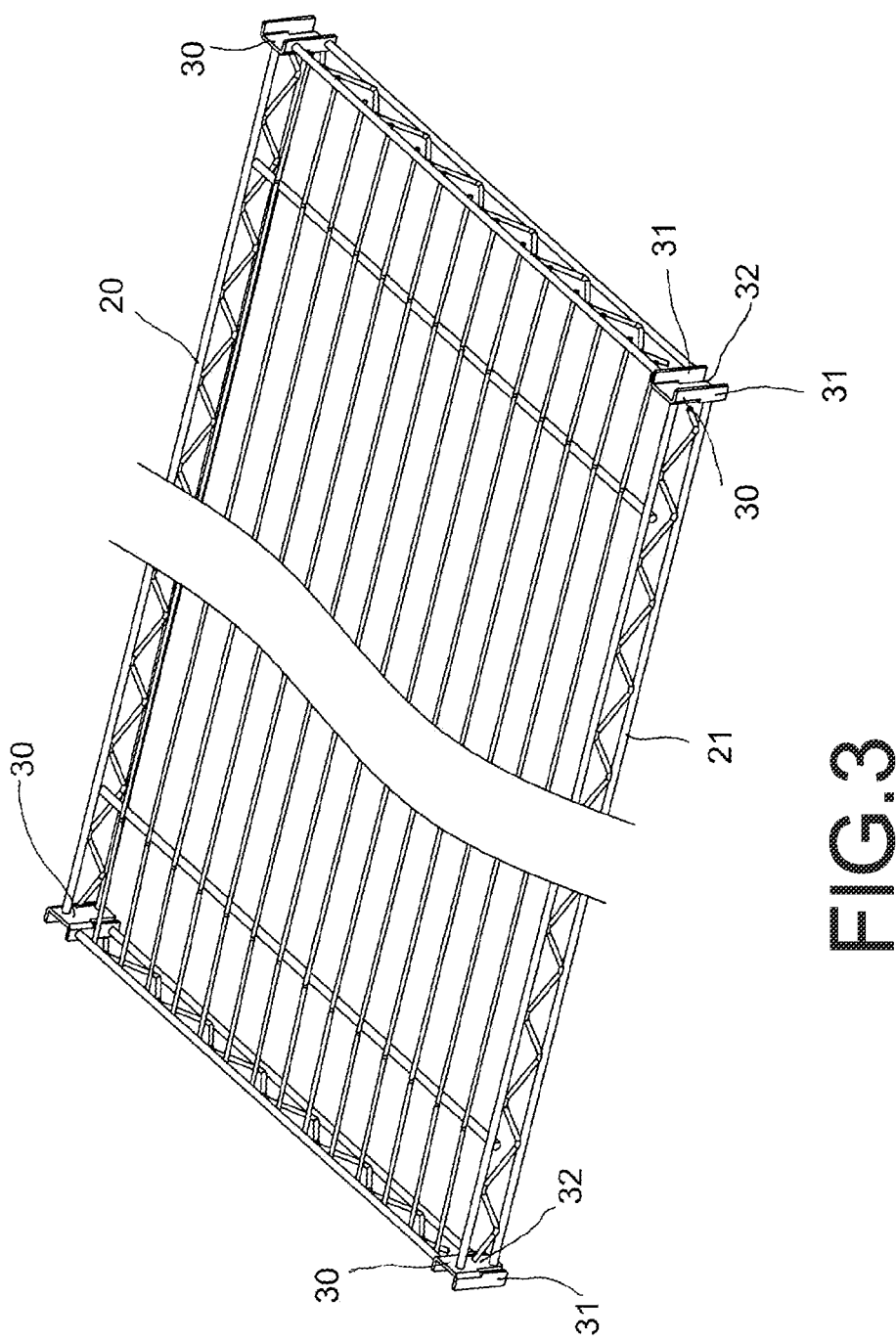
FIG. 3 shows the external drawing of the storage layer.

Please refer to FIG. 3. The front and rear ends of the storage layer 20 each offers an outward-opening U-shaped fastener 30. Four corners of the storage layer 20 can each be assembled onto the vertical poles 11 of the four column units 10. Each of the vertical poles 11 on the four column units 10 can be installed a clip 40. The clip 40 has a vertical groove 41 to allow embedding of the corresponding vertical pole 11. With the four fasteners 30 of the storage layer 20 and the corresponding four clips 40 clamping the four vertical poles 11, the storage layer 20 is assembled onto the four column units 10.

Figure 4:
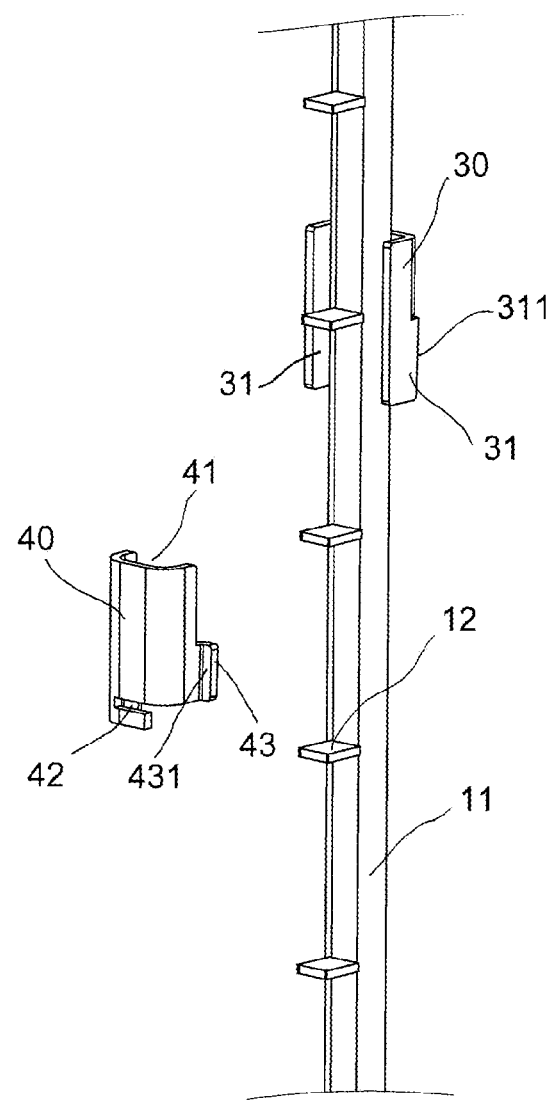
FIG. 4 shows the drawing of the clip assembled on the pole.
Figure 5:
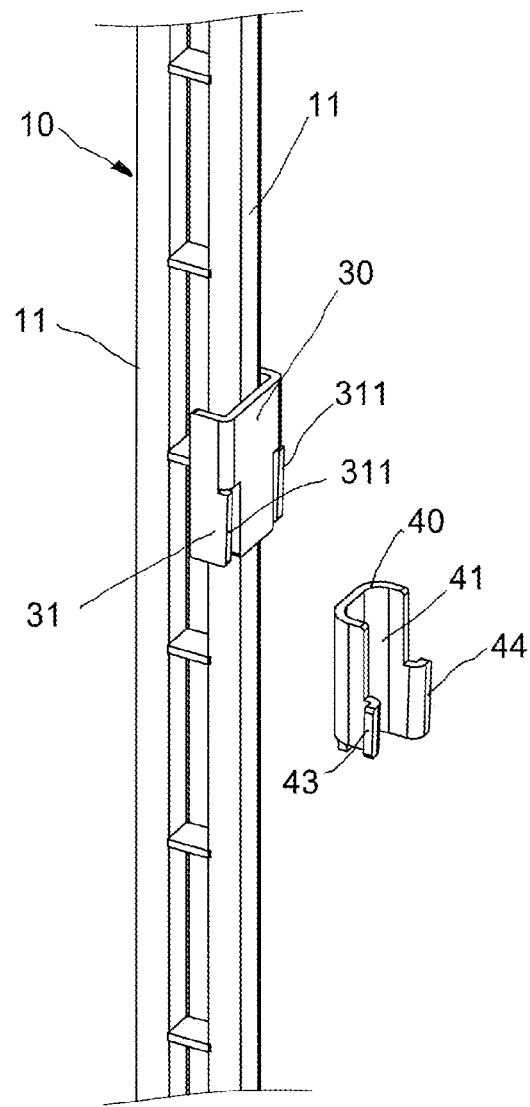
FIG. 5 shows the drawing of the clip assembled on the pole from another angle.
Figure 7:
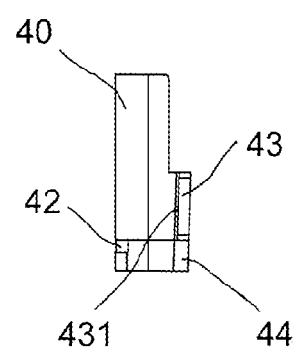
FIG. 7 shows the side view of the clip.
Figure 8:
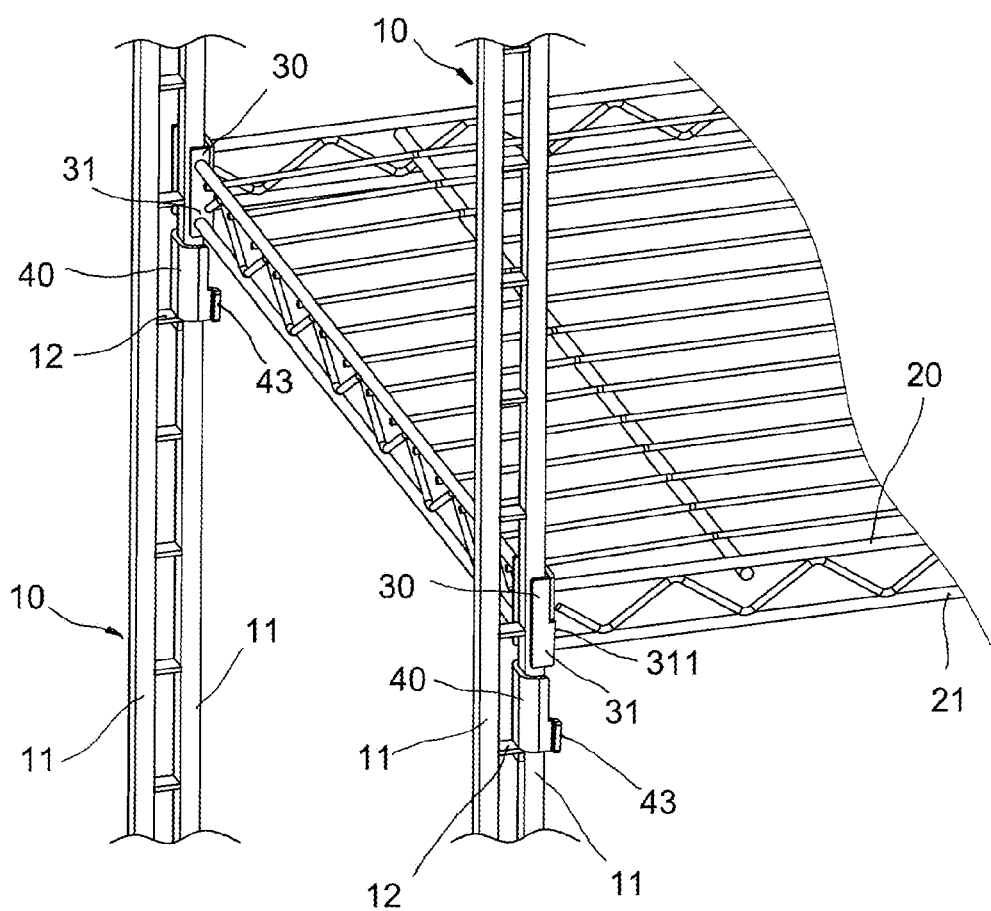
FIG. 8 shows the operation drawing of the storage layer assembled on the vertical pole.
Figure 9:
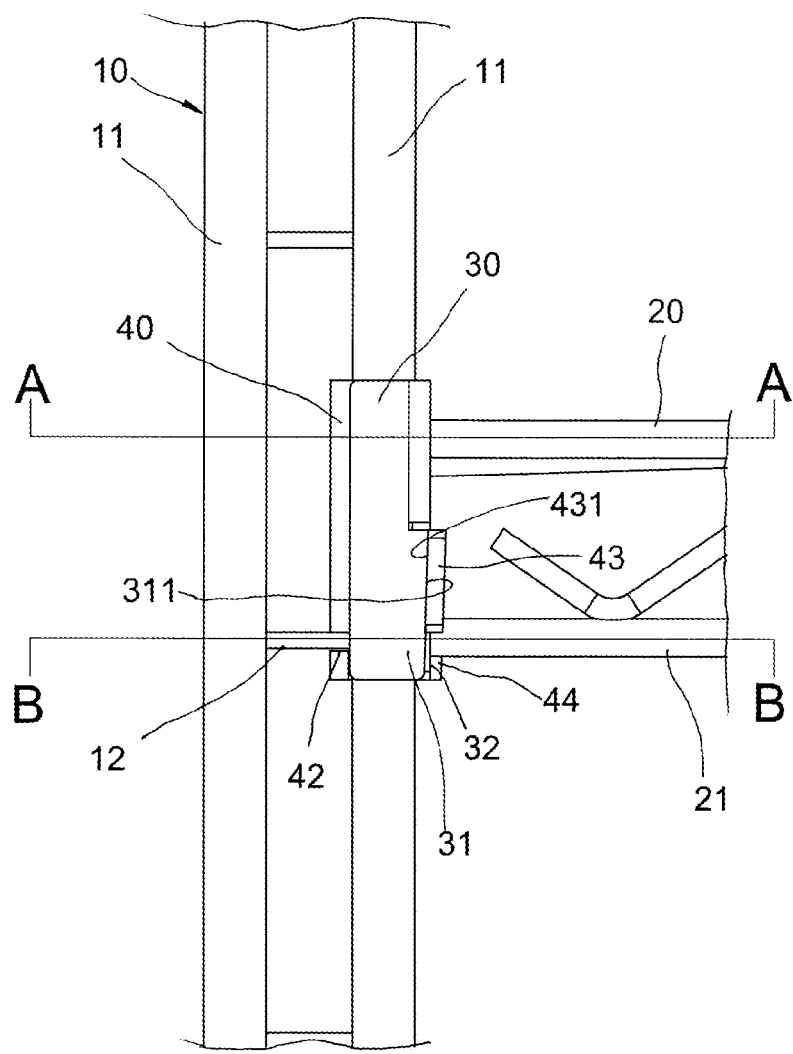
FIG. 9 shows the side view of the storage layer assembled on the vertical pole.
Figure 10:
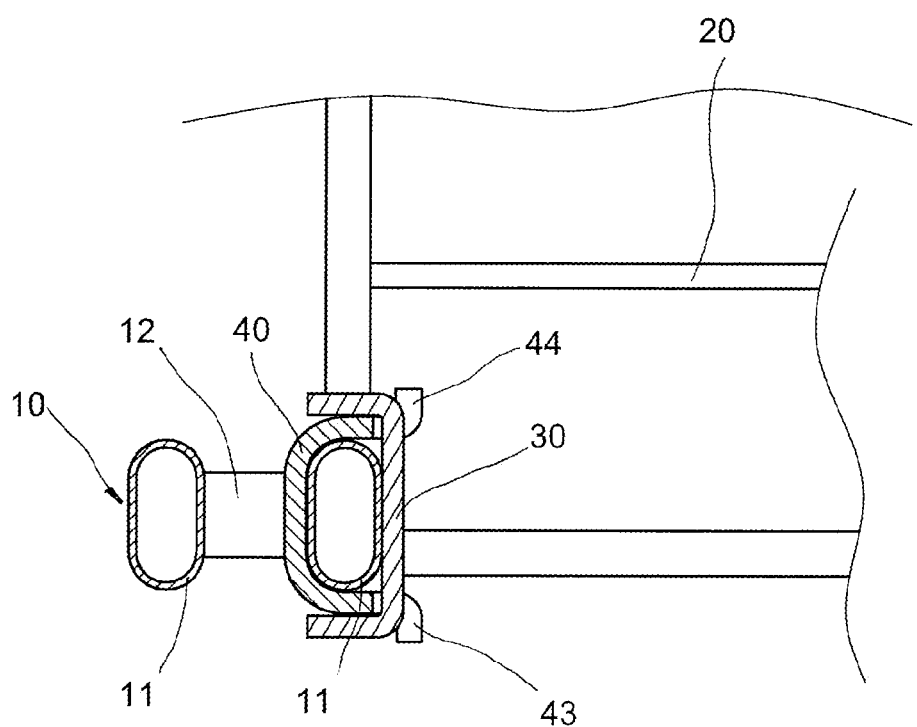
FIG. 10 shows the enlarged A-A section of FIG. 9.
Figure 11:
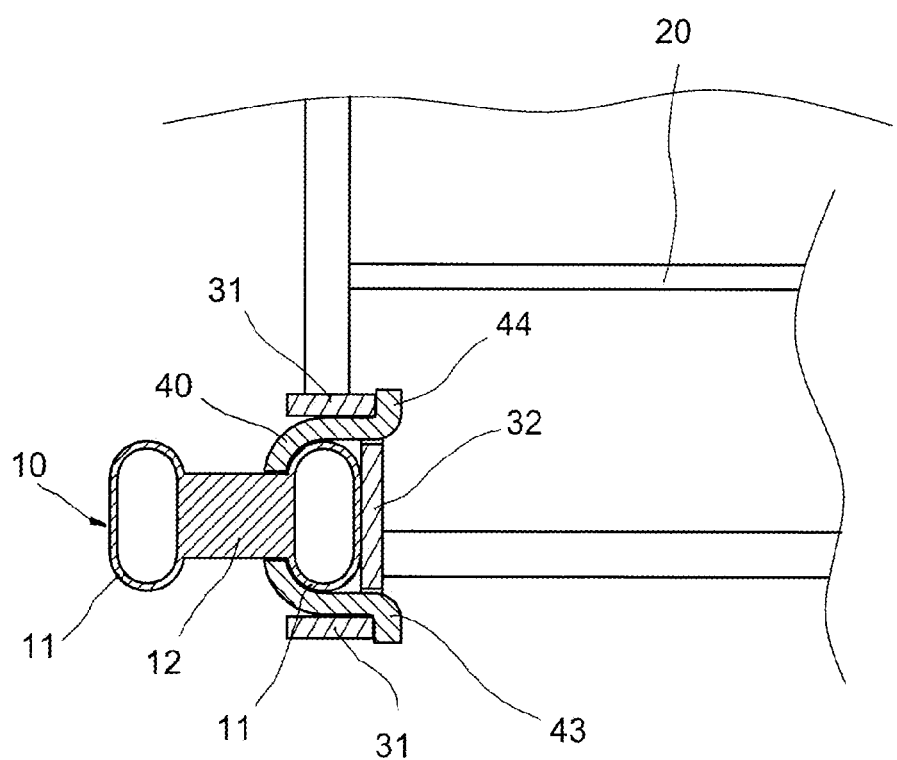
FIG. 11 shows the enlarged B-B section of FIG. 9.

See FIGS. 4, 5, and 7. The lower end of the clip 40 has a horizontally extending groove 42. The connection 12 of the column unit 10 can be inserted into the groove 42 of the clip 40 to secure the position of the clip 40 on the vertical pole 11. This allows the clip 40 to be supported by the connection 12. The lower halves of the front and rear ends of the groove 41 opening of the clip 40 are each connected to a wing 43, 44. The outer faces of the two wings 43 and 44 are bevels where the lower ends gradually protrude outward. The outer faces 431 of the two wings 43 and 44 (see FIG. 7 for the outer faces of the wing 44, not shown in Figure) have the same slope. After the clip 40 is embedded into the vertical pole 11, the opening of the groove 41 faces the storage layer 20. Since the opening of the groove 42 faces forward (as shown in FIG. 5), the bottom edge of the front wing 43 is higher than the bottom edge of the rear wing 44.

Figure 6:
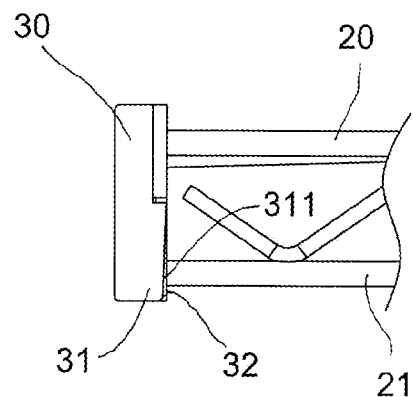
FIG. 6 shows the side view of the fastener.

Please refer to FIGS. 4 to 6. The front and rear edges on half of the fastener 30 each has a top pusher 31 extending towards the storage layer. The inner faces 311 of the two top pushers 31 are bevels. The upper ends of the inner faces 311 of the two top pushers 31 protrude gradually from the lower ends. The slopes of the inner faces 311 of the two top pushers 31 are the same. In the production of the fastener 30, a metal plate is properly cut before it is bent into a U-shape, which naturally forms the fastener 30 with the two top pushers 31. This forms a pressure plate 32 between the two top pushers 31. The two sides of the pressure plate 32 and the two top pushers 31 are separated. The top end of the pressure plate 32 is connected to the body of the fastener 30. The pressure plate 32 is welded into one piece with the crossbar 21 of the storage layer 20.

Please refer to FIGS. 8 to 11. In the operation of the four column units 10, the storage layer 20 moves from the top down, allowing the fasteners 30 of the front and rear ends on both sides of the storage layer 20 to each cover the exterior of the corresponding clips 40 of the front, rear, left and right column units 10. In this state, the front and rear end plates of the fastener 30 each covers the exterior of the front and rear faces of the clip 40. The inner faces 311 of the two top pushers 31 of each fastener 30 press the outer faces 431 of the wings 43, 44 of the corresponding clips 40. As the storage layer 20 moves downward, by means of fitting and pushing together the corresponding bevels of the top pushers 31 and the two wings 43, 44, the clips 30 and the fasteners 40 are pressed to each other and, thus, clamping the vertical pole 11. The storage layer 20 can then be assembled onto the four vertical poles 11.

Figure 12:
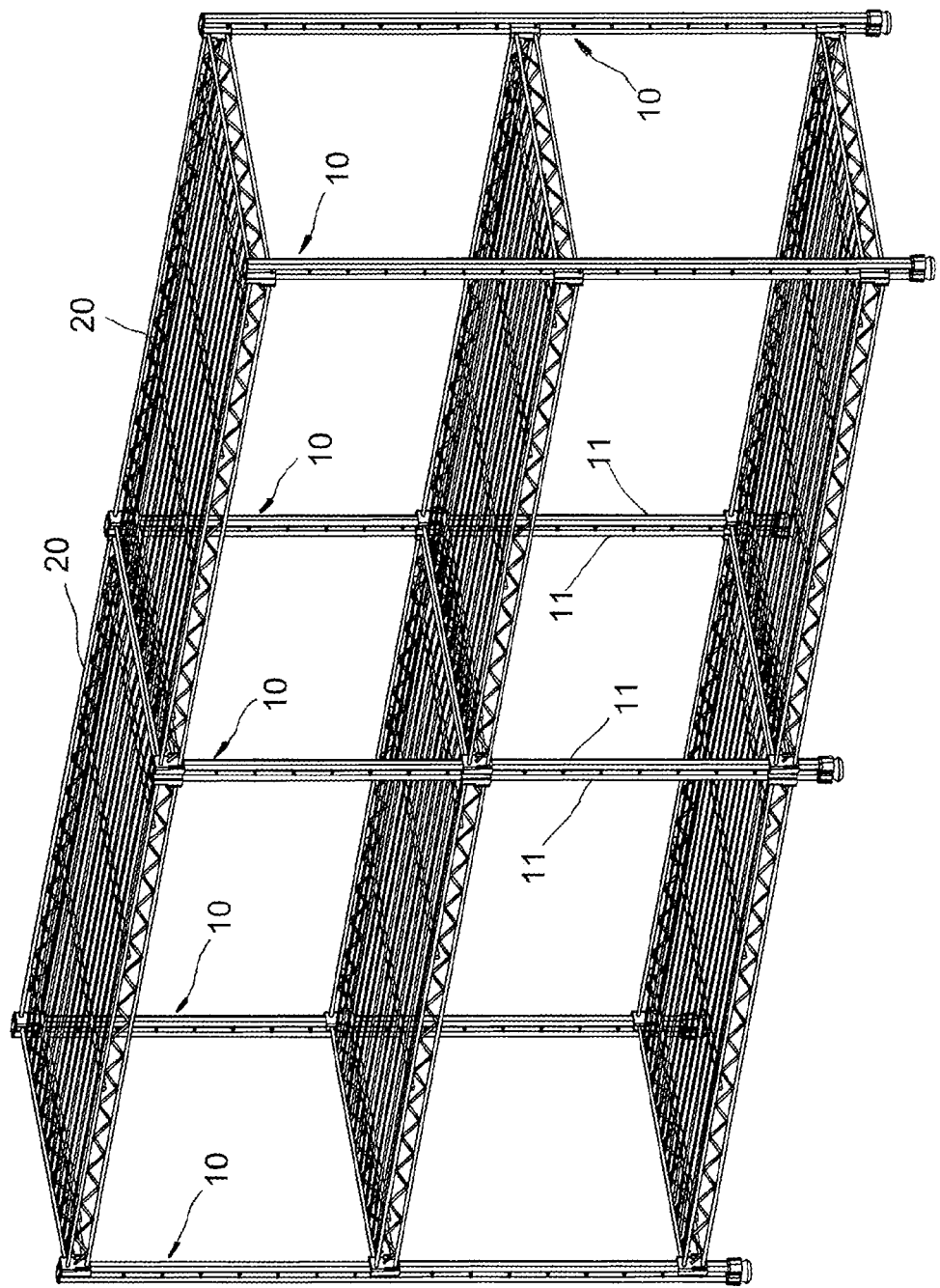
FIG. 12 shows the appearance of another embodiment of the invention.

The column units 10 has left and right vertical poles 11. The left and right sides of the two vertical poles 11 can accommodate two storage layers 20. And the two storage layers 20 can be at the same height, as shown in FIG. 12. This offers the assembled shelf a coordinated, beautiful appearance.

In summary, when the storage layer 20 of the combination shelf, disclosed in this invention, is moved downward along the clip 40 until no movement is allowed, it means that the clip 40 and the fastener 30 have fully clamped the vertical pole 11. The connection between the storage layer 20 and the vertical pole 11 offers high rigidity and reliability. This invention therefore offers higher rigidity and durability compared to the first disclosed U.S. Pat. No. 8,651,300.

What is claimed is:

1. A combination shelf which includes: at least four column units, at least two storage layers, and multiple clips; each of the least four column units is positioned at each corner of each storage layer; each of the clips secures each corner of each storage layer to one respective column unit; each of the column units consists of a pair of vertical poles arranged in parallel and connected by multiple connections; both ends of each of the multiple connections links each of the pair of the vertical poles; each of the multiple clips has a vertical groove with two wings respectively attached to both sides of an opening of the vertical groove; outer faces of the two wings are bevels and lower ends of the two wings protrude outward; each of the multiple clips is embedded into one of the vertical poles and supported by one of the connections; each vertical groove is facing one of the storage layers;

wherein the two wings of each clip are located at the lower half of the opening of the respective vertical groove; each clip further has a horizontally extending groove at a lower end of each clip; each of the connections of the column units is inserted into one of the horizontally extending grooves of the clips to secure the respective clip; each corner of each storage layer has an outward-opening U-shaped fastener; each side of a lower half of each outward-opening U-shaped fastener has a top pusher extending towards the storage layer; each top pusher is a bevel and protrudes from a lower end of each top pusher to an upper end of each top pusher; each of the outward-opening U-shaped fasteners covers the corresponding clip and inner faces of the two top pushers of each outward-opening U-shaped fastener press against outer faces of the wings of the corresponding clip when securing the corresponding storage layer to one of the column units; by fitting together the corresponding bevels of the top pushers and the two wings, the clips and the fasteners press against each other and therefore clamp the respective vertical pole.

2. The combination shelf, as claimed in claim 1, wherein the vertical poles of each of the column units are flat tubes have arched ends and flat mid-sections.

3. The combination shelf, as claimed in claim 1, wherein the clips are made from a metallic material.

4. The combination shelf, as claimed in claim 1, wherein there is a pressure plate between the two top pushers; the two sides of the pressure plate and the two top pushers are separated; the top end of the pressure plate is connected to the body of the fastener.

* * * * *